No. 616,005. Patented Dec. 13, 1898.
A. W. McGAHAN.
PIPE COUPLING.
(Application filed Oct. 5, 1897.)

(No Model.)

WITNESSES:
John Buckler,
C. Gerst

INVENTOR
Alexander W. McGahan.
BY Edgar Tate & Co.
ATTORNEYS.

UNITED STATES PATENT OFFICE.

ALEXANDER WILSON McGAHAN, OF SALINAS, CALIFORNIA.

PIPE-COUPLING.

SPECIFICATION forming part of Letters Patent No. 616,005, dated December 13, 1898.

Application filed October 5, 1897. Serial No. 654,168. (No model.)

*To all whom it may concern:*

Be it known that I, ALEXANDER WILSON MCGAHAN, a citizen of the United States, residing at Salinas, in the county of Monterey and State of California, have invented certain new and useful Improvements in Pipe-Couplings, of which the following is a full and complete specification, such as will enable those skilled in the art to which it appertains to make and use the same.

My invention relates to pipe-couplings, and has for its object the production of a coupling of the above class that while forming a tight joint when applied to the ends of adjacent pipes will be capable of being readily removed from its relation thereto, rendering an expeditious uncoupling of said pipes possible without a consequent mutilation of the pipes and loss of time in breaking joints and readjusting the parts.

A further object is to provide a coupling that may be employed in connection with the form of pipe now most commonly used and that can be applied to said pipes expeditiously, thus obviating the loss of time in making a solder-joint.

A still further object is to provide a pipe-coupling that is simple in construction, efficient in operation, and comparatively inexpensive to manufacture.

The invention consists in the novel features of construction hereinafter set forth and described, and more particularly pointed out in the claims hereto appended.

Figure 1:
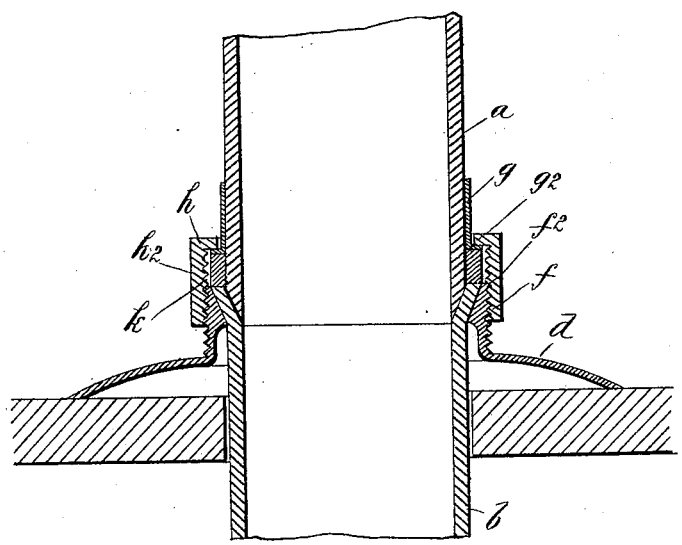
Figure 2:
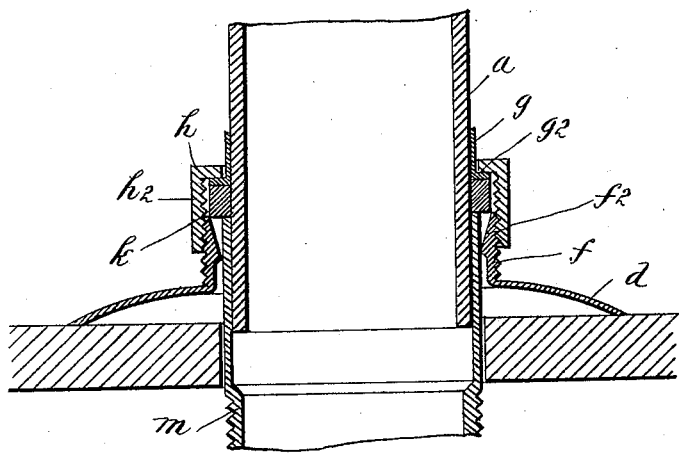

Referring to the accompanying drawings, which form a part of this specification, Figure 1 is a sectional elevation of my improved coupler as applied to the adjacent end of two lead pipes, and Fig. 2 a similar view showing how it may be applied when the pipe is made of iron or other material not plastic.

Like letters refer to like parts in both views.

In the accompanying drawings, $a$ denotes a waste-pipe in any part of a plumbing system, which communicates with a pipe $b$, the ends of which are beveled and flared, respectively, which construction is that commonly employed in the plumbing trade to form a more perfect joint than what can be attained by abutting plane surfaces.

$d$ represents a flange, preferably circular in form, having an annular screw-threaded vertical flange $f$ firmly attached thereto or made integral therewith, the interior of which is beveled at $f^2$ to an extent corresponding to that ordinarily employed to form the overlapped joinder of the pipes $a$ and $b$, thus forming a sloping seat for the flared end of the pipe $b$. The flange, if desired, may be provided with openings therein to facilitate its attachment to the floor without departing from my invention.

The waste-pipe $a$ has encompassing the same an annular sliding collar $g$, preferably constructed of brass and provided with a laterally-extended shoulder $g^2$, rigidly attached thereto or made integral therewith. Encompassing the waste-pipe and the annular collar $g$ is an annular collar which is composed of an abutment $h$, adapted to bear upon the laterally-extended shoulder $g^2$ on the sliding collar $g$, and an interiorly-screw-threaded depending rim $h^2$, adapted to coöperate with the screw-threaded flange $f$ to form a joinder of the two pipes. Between the flange $g^2$ and the exposed plane between the inner and the outer periphery of the pipe is a suitable gasket or packing $k$, which is provided in order to insure a perfectly-tight joint.

In some plumbing systems pipe of iron or some other equally non-plastic material is employed, which in many instances does not extend to or through the flooring or wall, thus necessitating the employment of a nipple $m$, Fig. 2, screw-threaded to correspond with the connecting-thread of the pipe $b$. The construction of my coupler, it will readily be observed, is identical in each of these views, Fig. 2 being merely to illustrate its application to pipes of other than plastic material.

The nipple $m$ is made of greater diameter than the waste-pipe $a$ in order that its upper end may receive and completely encompass the lower end of the said waste-pipe, and when the pipe $b$ is not otherwise adequately supported it may be firmly attached to the vertically-extended flange $f$ of the flange $d$.

In operation my improved pipe-coupling is applied as follows: When both the waste and adjacent pipes are of lead, the flange $d$ is placed in position around the exposed end of the said pipe $b$ and the edges of the same so flared outwardly as to rest upon the bearing-surface $f^2$, formed by beveling the interior of the vertically-extended flange $f$. The annular collars $h$ and $g$ are then mounted on the waste-pipe in the order named, so that the surfaces of the shoulder $g^2$ and abutment $h$ will contact. The gasket or packing $k$ is then introduced and the end of said waste-pipe beveled and fitted into the flared opening in the upper extremity of the pipe $b$. To accomplish a suitable joinder of the waste-pipe and the pipe $b$, it is merely necessary to bring the threaded portions of the flange $f$ and rim $h^2$ in the proper relation and compress the gasket $k$ between the shoulder $g^2$ and the upper plane of the edge of the pipe $b$ by means of the abutment $h$ on the revolving collar supporting said rim.

In Fig. 2 the operation, as well as the construction of my device, is identical with that shown in Fig. 1 and described above, the only difference being in the adjustment of the nipple $m$, the method of accomplishing which is obvious, which, as aforesaid, is merely a difference in application and not in construction. It is obvious that the length of the nipple $m$ may be decreased at will to form a more perfect connection between the ends of adjacent pipes and may be soldered to the flange $f$, as aforesaid, to lend additional support to the said pipes. The joint thus formed may be readily separated to facilitate the cleaning of the pipe by simply separating the screw-thread on the rim $h^2$ from that on the vertically-extended flange $f$, which can be accomplished without loss of time, thus permitting the disintegration of the coupling by a simple reversal of the operation above described.

By the means above described I attain the end of my invention. I have produced a coupling which will admit of an expeditious separation of the ends of the waste-pipe when it passes through the wall or floor to facilitate the cleansing of the same, which in the more common plumbing systems requires the unsoldering of a joint or the breaking of a pipe in order to effectually remove the obstructing matter in case of stoppage by means of a force-pump. This unsoldering and sawing of pipes is accomplished with much loss of time and cannot be undertaken except by a skilled workman.

It will be readily understood that my improved coupling can also be applied to any form of pipe of equal dimensions in use and will prove equally efficient in any connection.

The coupling heretofore described is simple in construction, efficient in operation, and comparatively inexpensive to manufacture.

It is to be observed that it is not my intention to limit the invention to the precise construction hereinbefore set forth, as it is obvious that there may be many variations in minor details of construction without departing from the spirit and scope of my invention.

Having fully described my invention, I claim as new and desire to secure by Letters Patent—

1. In a pipe-coupling, the combination with the overlapping ends of two pipe-sections, of a flange surrounding the end portion of the outer pipe, and provided with an annular screw-threaded flange extending toward the other pipe, a screw-threaded rim fitting upon said annular flange and surrounding the end portion of the inner pipe, and a gasket around said inner pipe and between the end of the outer pipe and said rim, substantially as set forth.

2. In a pipe-coupling, the combination with the overlapping ends of two pipe-sections, of a flange surrounding the end portion of the outer pipe and provided with an annular screw-threaded flange extending toward the other pipe, a screw-threaded rim fitting upon said annular flange and surrounding the end portion of the inner pipe, an abutment upon said rim, a collar between said rim and inner pipe, a shoulder upon said collar abutting against the inner face of said abutment, and a gasket surrounding said inner pipe and situated between the end of the outer pipe, and the shoulder, substantially as set forth.

3. In a pipe-coupling, the combination with the overlapping end of two pipe-sections, of a flange surrounding the end portion of the outer pipe and provided with an annular screw-threaded flange extending toward the other pipe and having a beveled seat at its end to receive the flanged end portion of the outer pipe, a screw-threaded rim fitting upon said annular flange and surrounding the end portion of the inner pipe, and a gasket around said inner pipe and between the end of the outer pipe and said rim, substantially as set forth.

4. In a pipe-coupling, a flange, a vertically-extended screw-threaded flange, a sliding collar, a shoulder thereon, a second sliding collar comprising an abutment adapted to bear upon said shoulder, and an interiorly-screw-threaded rim whereby the joinder of the ends of the adjacent pipes is accomplished, said vertically-extended flange being provided interiorly with a beveled bearing-surface adapted to receive the flared edge of one of said pipes, and a gasket or packing between said shoulder and the surface between the inner and the outer periphery of one of said pipes, substantially as shown and descibed.

In testimony that I claim the foregoing as my invention I have signed my name, in presence of the subscribing witnesses, this 27th day of September, 1897.

ALEXANDER WILSON McGAHAN.

Witnesses:
J. N. ANDERSON,
F. W. SNEIBLE.